(12) United States Patent
Hoffman (10) Patent No.: US 10,914,438 B2
(45) Date of Patent: Feb. 9, 2021

(54) LED LIGHT LINEAR STRIP, MOUNTING STRUCTURE AND CLIP ASSEMBLY

(71) Applicant: Jeremy P. Hoffman, Newtown, PA (US)

(72) Inventor: Jeremy P. Hoffman, Newtown, PA (US)

( * ) Notice: Subject to any disclaimer, the term of this patent is extended or adjusted under 35 U.S.C. 154(b) by 257 days.

(21) Appl. No.: 16/168,086

(22) Filed: Oct. 23, 2018

(65) Prior Publication Data

US 2019/0323667 A1    Oct. 24, 2019

Related U.S. Application Data

(63) Continuation of application No. 15/335,406, filed on Oct. 26, 2016, now Pat. No. 10,107,464.
(Continued)

(51) Int. Cl.
| | |
|---|---|
| *F21V 19/00* | (2006.01) |
| *F21S 4/22* | (2016.01) |
| *F21V 23/06* | (2006.01) |
| *F21V 21/005* | (2006.01) |
| *F21S 2/00* | (2016.01) |
| *H05B 45/00* | (2020.01) |

(Continued)

(52) U.S. Cl.
CPC . *F21S 4/22* (2016.01); *F21S 2/00* (2013.01); *F21V 19/003* (2013.01); *F21V 19/0055* (2013.01); *F21V 21/005* (2013.01); *F21V 21/088* (2013.01); *F21V 23/06* (2013.01); *H05B 45/00* (2020.01); *H05B 45/10* (2020.01); *H05B 47/18* (2020.01); *F21S 4/28* (2016.01); *F21Y 2103/10* (2016.08); *F21Y 2115/10* (2016.08); *Y02B 20/30* (2013.01)

(58) Field of Classification Search
CPC ........ F21S 4/22; F24V 19/003; F24V 19/004; F24V 19/0045; F24V 21/088; H05B 45/00; H05B 45/10; H05B 47/18
USPC ...................................... 362/217.12
See application file for complete search history.

(56) References Cited

U.S. PATENT DOCUMENTS 4,173,035 A * 10/1979 Hoyt ................. F21V 21/08
  362/249.04
4,878,862 A * 11/1989 Wise ................. H01R 25/162
  439/787
(Continued)

FOREIGN PATENT DOCUMENTS

JP      2012033321 A *  2/2012

*Primary Examiner* — Christopher M Raabe
(74) *Attorney, Agent, or Firm* — Clinton H. Wilkinson (57) ABSTRACT

A system and method comprised of an LED light strip whose electrically insulating core structure is somewhat flexible and elastic and whose alternating light producing sections and narrower clip sections have a top side containing LED elements and control signals and an underside containing a high capacity voltage bus, and a three sided mounting structure where an installed LED light strip is the fourth side with LED elements facing out and the voltage bus protected inside, and a clip system of two halves which affix to each other around a narrower clip section with a lower half connecting electrically to the voltage bus under the narrower clip section and installing in one side of the mounting structure and an upper half connecting electrically to control signals on the top half of the narrower clip section and installing in the other side of the mounting structure.

20 Claims, 5 Drawing Sheets

Related U.S. Application Data (60) Provisional application No. 62/246,389, filed on Oct. 26, 2015.

(51) Int. Cl.
  H05B 45/10 (2020.01)
  H05B 47/18 (2020.01)
  F21V 21/088 (2006.01)
  F21S 4/28 (2016.01)
  F21Y 103/10 (2016.01)
  F21Y 115/10 (2016.01)

(56) References Cited

U.S. PATENT DOCUMENTS

| | | | | |
|---|---|---|---|---|
| 4,938,701 A * | 7/1990 | Heberling | | H01R 12/732 439/327 |
| 5,107,408 A * | 4/1992 | Vernondier | | E04F 19/061 362/219 |
| 6,796,680 B1 * | 9/2004 | Showers | | F21V 15/013 362/240 |
| 7,892,022 B2 * | 2/2011 | Mostoller | | F21V 19/0055 439/507 |
| 2003/0223235 A1 * | 12/2003 | Mohacsi | | F21V 21/005 362/240 |
| 2008/0298058 A1 * | 12/2008 | Kan | | F21V 21/005 362/240 |
| 2012/0081899 A1 * | 4/2012 | Yu | | F21V 21/005 362/249.02 |
| 2012/0250309 A1 * | 10/2012 | Handsaker | | F21V 5/007 362/235 |
| 2013/0070452 A1 * | 3/2013 | Urano | | F21K 9/27 362/231 |
| 2013/0100668 A1 * | 4/2013 | Hsu | | F21S 4/22 362/249.01 |
| 2014/0043802 A1 * | 2/2014 | Dings | | F21V 23/0471 362/221 |
| 2014/0160747 A1 * | 6/2014 | Jang | | F21S 8/061 362/235 |
| 2014/0177209 A1 * | 6/2014 | Carney | | F21S 2/005 362/147 |
| 2014/0218924 A1 * | 8/2014 | Levante | | F21V 23/06 362/249.04 |
| 2014/0265809 A1 * | 9/2014 | Hussell | | F21V 23/06 313/3 |
| 2014/0268728 A1 * | 9/2014 | Hussell | | F21K 9/90 362/225 |
| 2019/0154241 A1 * | 5/2019 | Danville | | F21V 23/001 |

* cited by examiner

LED LIGHT LINEAR STRIP, MOUNTING STRUCTURE AND CLIP ASSEMBLY

CROSS-REFERENCE TO PREVIOUS RELATED APPLICATIONS

This application is a continuation of U.S. patent application Ser. No. 15,335,406, U.S. Pat. No. 10,107,464, which claims priority to U.S. Provisional Pat. Appln. No. 62/246,389, filed on Oct. 26, 2015, the entirety of the disclosures of which applications and patents is hereby incorporated by reference.

FIELD OF THE INVENTION

The present invention relates to lighting devices, and more particularly to LED lighting devices including a mounting structure and clip assembly for factory or field assembled luminaires.

BACKGROUND OF THE INVENTION

LED based lighting has increasingly become an attractive mode of lighting used for many purposes. One of the advantages of LED lighting is the ability to create long linear runs of individual LED elements which are wired into LED light strips. LED light strips can take many forms, but most have a narrow width and a continuous length which can be divided into smaller sections whose lengths vary, but are usually under six inches in length. These LED light strips are flat and produce light with a wide beam angle and are well suited to a variety of applications. Usually these LED light strips are composed of a flexible printed circuit which is printed on a thin flexible substrate where that substrate is not much wider than the LED elements themselves. This is convenient in that the resulting LED light strip is itself narrow, and can be installed without taking up much room. A drawback to this approach is that the conductors must also be narrow, and consequently they cannot carry very much power. This limits the length an LED light strip can run before it must be re-powered, often to 10 meters or less. This is most often due to voltage drop, or the resistive losses associated with running too much power through too small conductors. An LED light strip which could find the area within which to run large conductors while still maintaining the advantage of a narrow profile would be desirable.

LED light strips have a great advantage in their ability to vary the length of an installation in small increments. This is due to LED light strips being designed as a continuous strip of individual sections, where the individual sections are inches long and can be separated at any point within a strip of sections, as long as each section is complete from end to end. This means an installation whose LED light strip individual sections are four inches long, can be any length that is a multiple of four inches, up to its power limitations. This modularity is desirable, and is made possible by the clip systems (sometimes called connectors) many LED light strip systems use. Some LED light strip systems still use a direct solder connection method, but those are less desirable and becoming less common. A clip system usually uses a plastic clip which closes over the end of one LED light strip section, where it makes electrical contact with the LED light strip and can thereby deliver power or control signals such as dimming level. These clip systems, while increasing convenience also need space to connect their wires, whether from a power supply or a controller. This means that if a clip is to be installed in the middle of an existing continuous installation of LED light strip sections which have not been separated, the LED light strip would have to be cut between sections, and then at least one of the two resulting LED light strip sections would need to be moved to create the needed space for the clip between the previously connected sections. This could require removing and reinstalling a significant portion of an LED light strip installation every time one or more clips must be installed.

The need to create space between newly separated LED light strip sections for clip installation is particularly problematic when replacing a broken or defective section of LED light strip, since a replacement section for the defective section must have a clip to connect the section to the existing installation at each end of the replacement section, requiring significant modification to the original installation. An improved LED light strip system would allow for clip installation without changing the length of an installation, whether in the design phase, during repair and replacement, or during reconfiguration changes.

Another challenge of LED light strips is that their structure is not very durable or strong. Further, the installation method most commonly used is double-sided tape applied to the surface the LED light strip is to be mounted on and to the rear of the LED light strip. Such an installation does not provide a high degree of mechanical security to an installation, and makes service, repair and reconfiguration more difficult. An improved LED light strip system would provide a mechanically secure installation which can be serviced, repaired and reconfigured without modification to the original installation location. Mechanical security of a lighting system is of particular importance if the lighting system is to provide emergency lighting, such as lighting in egress passageways of commercial buildings.

An ideal lighting system would be one that combines the convenience and flexibility of current LED light strips with the mechanical and electrical security of a commercial grade lighting fixture.

BRIEF SUMMARY OF THE INVENTION

The present LED light strip assembly improves upon currently available LED light strip designs which results in an LED light strip system and method that is securely and removably installed using common hardware methods and practices into a mounting structure that is a simple open ended structure with a consistent profile along its length. The LED light strip has two primary sections which alternate repeatedly along its length. The first primary section of the LED light strip is the main light producing section which contains both the illumination LEDs and the primary means for securing the LED light strip within the mounting structure. The second primary section of the LED light strip is the clip section, which is narrower transverse to its length than the main light producing section. The LED light strip clip section also has an identified removable portion, which removes a short length of the entire structure of the LED light strip clip section leaving an equal portion of the clip section on either side of the removable portion. The smallest operative length of the LED light strip of the present invention includes one main light producing section where the removable portion of each clip section immediately adjacent to the light producing section has been removed.

The mounting structure within which the LED light strip of the present invention is installed contains a floor that is spaced apart from the underside of the LED light strip when installed. The mounting structure also contains a pair of opposing slots into which the edges of the main light producing section of the LED light strip are inserted. The LED light strip has a structural core or support structure along its length that is strong and sturdy enough to provide a physically secure structure of some thickness, flexibility and elasticity such that it can be deformed, as by pinching, so that the edges of the wider main light producing section can be installed into the slots. The elasticity ensures that the LED light strip returns to its original shape after installation in the slots within the mounting structure sides. Primary installation is completed when a fastener is secured through the light producing section of the LED light strip and through a height maintenance structure placed in the mounting structure underneath the LED light strip, which height maintenance structure establishes and maintains the height of the center portion of the LED light strip, transverse to its length, while the slots in the mounting structure maintain the height of the edges of the main light producing section of the LED light strip of the present invention. When the LED light strip of the present invention is installed in the mounting structure, a resulting compartment is created underneath the entirety of the installed LED light strip excepting the edge portions of the main light producing sections which are inside the mounting structure slots along the length of its sides. The LED light strip of the present invention is always installed within the mounting structure such that the LED light producing elements are facing out of the mounting structure, so as to effectively provide light to a space, with the underside of the LED light strip facing into the resulting compartment. The outward facing side of the LED light strip may be referred to as the top of the LED light strip and, correspondingly, the side of the LED light strip facing the compartment inside the mounting structure may be referred to as the bottom of the LED light strip.

The LED light strip of the present invention is powered by one or more electrical power busses which are at least partially secured to the underside of the LED light strip for the entirety of its length. Power is communicated from the underside bus(es) to each main light producing section by vias (vertical interconnect access) through the LED light strip structure, or by other methods of power communication through a circuit board or similar structures known in the art. The only way power is introduced to the light producing LED elements and supporting circuitry on the top side of the LED light strip is by these through-connections or vias providing power from underneath each section. Electrical power for the circuitry and for light production is never transmitted from one LED light producing section to the next by electrical connection on the top side of the LED light strip. Electrical power is transmitted between LED light producing sections exclusively by the voltage busses underneath the LED light strip structure and within the compartment resulting from LED light strip installation within the mounting structure.

Moving the electrical power bus(es) underneath the LED light strip and within the compartment resulting from installation within the mounting structure provides several advantages. First, the cross sectional space available for the busses is increased, since they do not have to share space with the LED light producing elements and associated circuitry. This allows for larger conductors which allows for more power to be carried further, allowing longer runs of LED light strip from a higher power source. The compartment also provides some physical protection, and may allow for higher power levels to be deployed while the shock risk to individuals is minimized.

The LED light strip of the present invention may also utilize control signals for its operation. Control signals circuits are different from electrical power circuits in that they are not designed to deliver electrical power, they just have enough electrical power to deliver and maintain a control signal, which is very little power. As such, control signals of the kind that would be deployed in an LED lighting system such as dimming signals, light sensor signals, are of such low power that they are considered inherently safe under the electrical code in the U.S. Also, since they are low power they do not require large conductors. The invention includes control signal conductors entirely on the outward facing side (top) of the installed LED light strip of the present invention. Also control signals are transmitted to adjacent LED light producing units by conductors which travel through the top of each clip section to the next LED light producing section. There can be one or more control signal circuits and conductors as needed for desired LED light strip function.

The present invention also provides a novel system and method for application of clips. A clip or clip assembly for this invention is comprised of two halves, a lower clip half and an upper clip half. The two clip halves attach to each other over the clip section of the LED light strip of the present invention with or without the identified removable portion of the clip section present, with the lower clip half being primarily under the bottom side of the LED light strip clip section and within the compartment, and the upper clip half being primarily on the top side of the LED light strip clip section. The lower clip half can make useful combinations of electrical connections with the one or more power busses within the compartment created underneath the installed LED light strip and can insert or remove power to the LED light strip through external wires connected to the lower clip half as needed. The lower clip half also contains a structural portion that extends into one slot on one side of the mounting structure, and not into the slot on the opposite side. The upper clip half can make useful combinations of electrical connections with the one or more control signal conductors on the top half of the LED light strip clip section and can insert or remove control signals through external wires which are connected to the upper clip half as needed. The upper clip half also contains a structural portion which extends into the slot on the opposite side from the slot containing the structure portion of the lower clip half. The two clip halves are then secured to each other over and around the clip section of the LED light strip of the present invention with the joined clip halves now secured within the mounting structure slots and secured around the clip section of the LED light strip.

One of the benefits of this novel LED light strip, mounting structure and clip system is that the presence of a clip does not at all change the installed position of the LED light strip along the length of the mounting structure. The installation fasteners which secure the LED light producing section of the LED light strip will use the same holes in the mounting structure before and after clip installation. Operations such as replacing one failed section of LED light strip can be undertaken without changing the original installation. Configuration changes of control signal lengths and power bus lengths can occur without altering an original installation. The removable portion of the clip section also allows for a fail-safe to ensure that a power bus break is executed correctly by including a piece of plastic or other insulating material that rises vertically from the lower clip half and into the space between the two sides of a clip section where the removable portion of the clip section would otherwise be. This fail-safe barrier both provides an electrically insulating barrier between two power bus segments and prevents the clip sections from being installed unless the removable section is, in fact, removed.

An additional benefit is the ability to provide plug-and-play access to power for other external devices from the bus(es) underneath the LED light strip. Such a clip assembly would contain electrical contacts for the power bus underneath the LED light strip, the removable portion of the clip section would not need to be removed, and there would be no need for control signal contacts in the upper clip half. There would also be external wires which are connected to the lower clip half electrical contacts using methods known in the art and can be installed on any LED light strip clip section that does not already contain a clip. As long as there is available wattage on that power bus, this power can be extracted without changing any other aspects of the original installation.

One particular aspect of the clip and LED light strip system is the ability to leverage the flexibility and elasticity of the LED light strip structure to provide a continuing force ensuring continued stable electrical contact within a clip, especially at the power busses where more contact transmission is necessary. The clip halves establish electrical connection by matching contact areas on the LED light strip with aligned contact areas within the respective clip halves. The clip halves are secured against each other and over the clip section of the LED light strip, either by a snap fit or by common nut and bolt type assembly, or other mechanically fastening methods known in the art. By designing the electrical contact portions of the clip halves such that they press into their respective contact on the LED light strip in such a manner that the contact on the LED light strip is pressed into the flexible structure of the LED light strip, the elasticity of the structure provides a countering force that presses the two contacts together. Therefore, an advantage of this invention is that the flexibility and elasticity of the structure of the LED light strip, which is required for installation, also provides flexibility for the structure to deform as the clip halves are joined together and their respective contacts are forced into the LED light strip which provides a force due to the structure attempting to return to its original form. It is this counter force that ensures electrical contact within the clip halves.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. Reference will now be made in detail to a preferred implementation of the present invention as illustrated in the accompanying drawings. Wherever possible, the same reference numbers will be used throughout the drawings to refer to the same or like parts.

Before the present invention is disclosed and described, it is to be understood that the terminology used herein is for the purpose of describing particular embodiments only and is not intended to be limiting. The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising. The term "coupled," as used herein, is defined as connected, although not necessarily directly, and not necessarily mechanically. Relational terms such as upper and lower, first and second, top and bottom, and the like may be used solely to distinguish one component or part from another component or part without necessarily requiring or implying any actual such relationship or order between such components or parts. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "about" or "approximately" as used herein apply to all numeric values, whether or not explicitly indicated. These terms generally refer to a range of numbers that one of skill in the art would consider equivalent to the recited values (i.e., having the same function or result).

Figure 1:
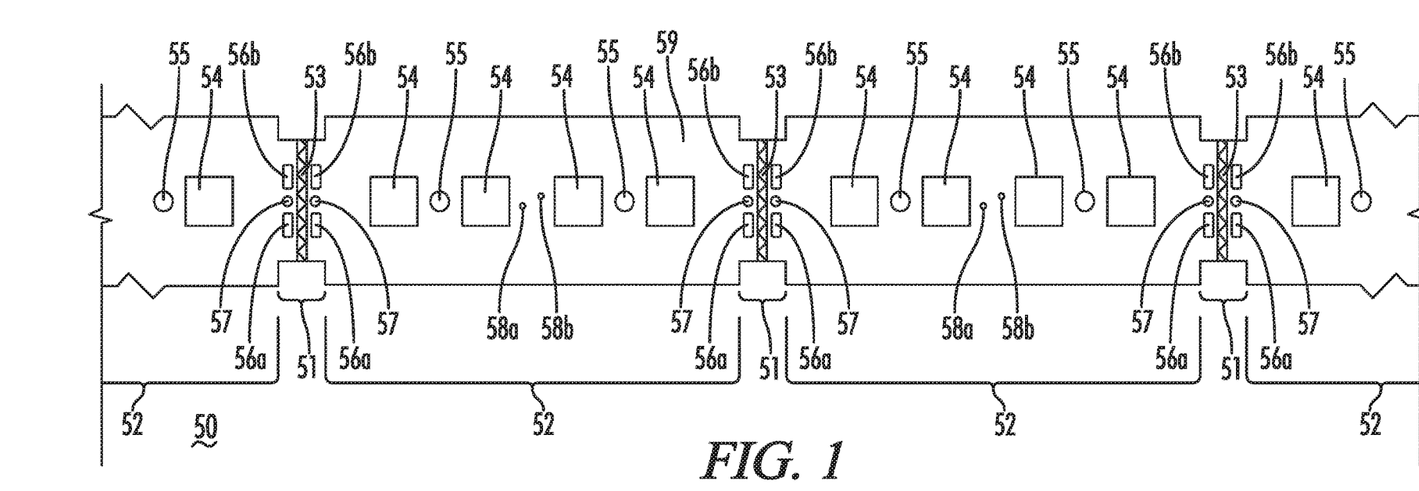
FIG. 1 is a top plan view of an embodiment of the LED light strip assembly of the present invention.
Figure 2:
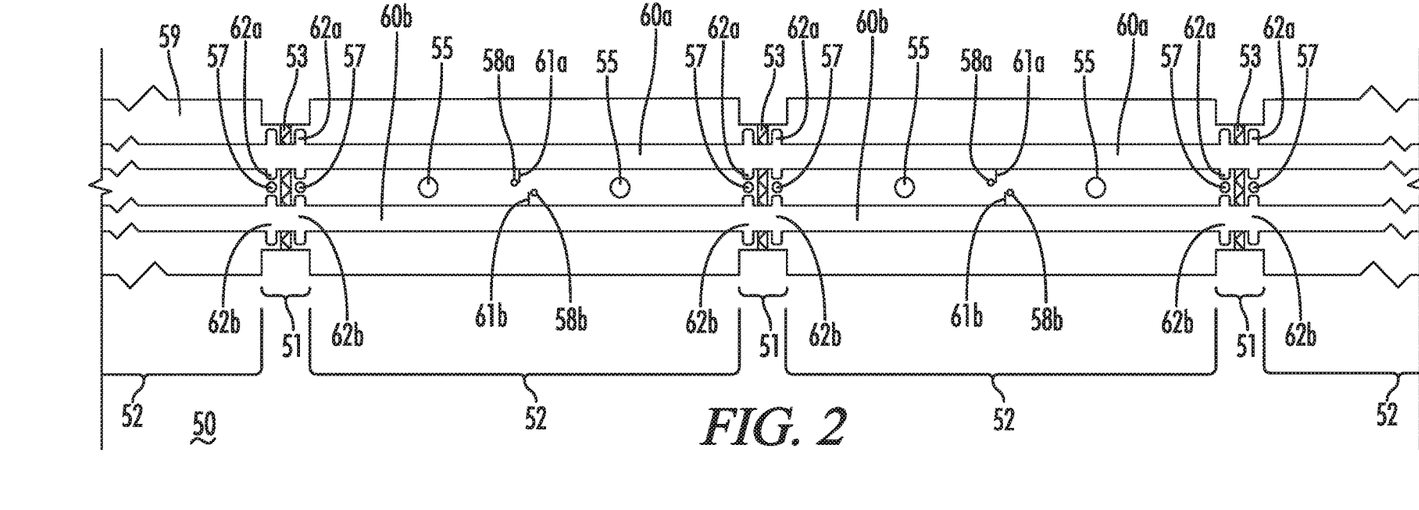
FIG. 2 is a bottom plan view of the embodiment shown in FIG. 1.

FIGS. 1 through 6 refer to a preferred embodiment of the present invention. Definition of some additional relative terms here may assist the reader. "Length" as used herein refers to the axis which runs through consecutive sections of the LED light strip, which as oriented in FIGS. 1 and 2 would be an axis travelling from left to right. "Width" as used herein refers to the distance across the LED light strip transverse to its length, as do similar descriptors such as "narrow". The portion of the LED light strip of the present invention shall be referred to relatively as the top of the LED light strip, such as describing the LED elements as being mounted to the top of the LED light strip, as illustrated in FIGS. 1, 4, 5, and 6. Similarly, the reverse side of the LED light strip shall be referred to as the bottom of the LED light strip, as shown in FIG. 2. The sides of LED light strip across its width shall be referred to as edges. Other relative terms such as under may be used and shall be seen as aiding this description, not limiting the orientations of the embodiments. For example, the LED light strip of the present invention could be installed under a shelf in a closet to illuminate the contents underneath that shelf. In that case, the "top" of the LED light strip as pictured in FIGS. 1, 4, and 5 would in fact be pointing down to illuminate the shelf contents. Such an implementation, and any other implementations within various orientations of the present invention described herein, shall not be limited by the relative terms. As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Referring now in particular to FIG. 1, an LED light strip 50 is illustrated as it would be seen from above, where above in this example refers to a straight-on view square to the LED elements 54 which produce the light for illumination of a space, where that light production is the primary purpose of LED light strip 50. LED light strip 50 is a linear LED light strip comprised of alternating sections 51 and 52, with each section 51 having a removable portion 53 which is equidistant from each immediately adjacent section 52 along the length of each section 51. The shortest functional length of the LED light strip of the present invention is one section 52 where the removable portion 53 of each immediately adjacent section 51 is removed.

LED light strip 50 is further comprised of a structural core 59 which is comprised of a somewhat flexible and elastic material such as polyurethane, and which may be extruded with a common profile of similar thickness across its width and length. The material selected for the core structure must also not conduct electricity. Clip sections 51 are narrower than sections 52 with respect to their width, and the core structure material may be removed in manufacturing as a secondary process after the extrusion of LED light strip core structure 59. Another secondary process such as laser cutting may be employed for precisely making both installation holes 55, clip alignment holes 57 and holes for vias 58a and 58b through core structure 59. All holes extend completely through core structure 59. Core structure 59 has sufficient strength to hold its form as a straight LED light strip while being supported along the edges of sections 52 and at periodic installation holes 55 within sections 52, including across unsupported sections 51. The electronics and wiring for the LED circuits on the top side of LED light strip 50 are printed directly onto the top surface of core structure 59 using methods known in the art of printed circuit boards (PCB)s, including printing control signal contacts 56a and 56b from a suitably conductive material such as copper. In this illustrated embodiment of the present invention core structure 59 is also the substrate onto which the circuits for LED light strip 50 are printed.

Section 51 is the clip portion of LED light strip 50, and contains a removable portion 53 which may be removed using common electrician's tools such as a high leverage cable cutter if desired. Section 51 is also considerably narrower than section 52 transverse to its length, which accommodates clip installation as is described below with particular reference being made to FIGS. 4 and 5. Section 51 contains two clip assembly alignment holes which are located on either side of removable portion 53 of each clip section 51, and are in the center of section 51 transverse to its length. Four control signal contacts, indicated by reference numerals 56a and 56b, are also printed on section 51 using standard methods and practices for PCBs. In one embodiment, the LED light strip of the present invention can carry one control signal, such as a dimming level signal, along its length using two control signal conductors (not illustrated in FIG. 1). The control signal transmits a signal level electric current which carries information but does not transmit power, such as would be needed to generate light. Accordingly, the control signals can be transmitted using thin copper signal traces according to standard PCB printing methods and practices. Control signal contacts 56a and 56b have more conductive surface than would be needed to transmit the control signals, but the surface area is to make contact with corresponding electrical contacts within an upper clip half as described and illustrated in FIG. 4. Control signal contacts 56a and 56b are arranged in pairs in this embodiment of the present invention, where each pair of one 56a and one 56b are collinear across LED light strip 50 clip section 51 and the control signal information is present in the electrical potential difference between each collinear pair. Each control signal contact 56a is also collinear along the length of LED light strip 50 with the other contact 56a on the other side of removable portion 53 within each clip section 51. Control signal contacts 56b are similarly collinear along the length of LED light strip 50 within each clip section 51.

Copper control signal traces are not illustrated in FIG. 1, but are configured as follows toward the presently described embodiment of the present invention. Copper signal traces directly connect the two control signal contact pairs within each clip section 51 to each other across removable portion 53 when removable portion 53 has not been removed. These copper signal traces connecting each pair of control signal contacts 56a and 56b necessarily establish the same control signal information for each pair of control signal contacts 56a and 56b within each clip section 51 where that removable portion 53 is present. A copper signal trace also connects to each control signal contact 56a and 56b on the opposite side from removable portion 53 within each clip section 51 where those traces enter light producing section 52 and the control signal information is put to purposeful use controlling the light produced within each section 52 according to the information, such as a dimming level, contained within the control signal. Each light producing section 52 has one pair of control signal contacts 56a and 56b within each clip section 51 which is immediately adjacent to each end of each section 52 which are connected directly to that section 52 before crossing any removable portion 53 within each immediately adjacent clip section 51. The control signal information at each of those immediately adjacent control signal contact pairs is the same, as each light producing section 52 reads and puts to meaningful use the control signal information but does not alter the information contained within the control signal. It is therefore necessarily the case that the control signal information contained in the immediately adjacent control signal contact pairs 56*a* and 56*b* within the immediately adjacent clip sections 51 at each end of each light producing section 52 is always the same. Therefore, control signal information such as dimming level will propagate unchanged along an installation of LED light strip 50 for as long as all removable portions 53 are present in an alternating series of light producing sections 52 and clip sections 51. When removable portion 53 of any clip section 51 is removed, and no electrical connection between the control signal contact pairs 56*a* and *b* within that clip section is made within the upper clip half, the control signal information may be different for each control signal contact pair 56 on either side of the removed removable portion 53 within that clip section 51.

Clip alignment holes 57 extend completely through LED light strip 50 clip section 51 and core structure 59. Clip alignment hole 57 is collinear across section 51 with control signal contacts 56 with one clip alignment hole 57 centrally located between each control signal contact pair 56*a* and 56*b*.

Section 52 is the main light producing section of LED light strip 50 as it contains LED elements 54 which emit light to the purpose of LED light strip 50. A chosen installation of LED light strip 50 may have any number of consecutive sections combining for any useful length where each section alternates with a section 52 following each section 51, and a section 51 following each section 52. At the termination of an installation a final section 52 will be followed by the portion of the last section 51 up to removable portion 53, with section 53 and beyond absent. This termination would be at each end of a chosen installation of the LED light strip of this first embodiment of the present invention.

LED elements 54 are the sources of illumination from LED light strip 50 of the present invention. Control signal information is conveyed to the LED circuitry within each section 52 through two control signal traces from each control signal contact pair 56 on the same side as that section 52 is relative to the removable portion 53 contained in each immediately adjacent clip section 51. The control signal information is the same at each control signal contact pair 56 at each end and is connected to the LED circuitry for processing. Signal traces (not shown) connect the control signal to the LED circuitry in a manner known in the art of LED circuitry for lighting. Vias 58*a* and 58*b* are a pair which transmit electrical power from the underside of LED light strip section 52 core structure 59 using methods known in the art for communicating power through a structure such as core structure 59. The electrical power needed to power each light producing section 52 of LED light strip 50 should be relatively small, for example less than 10 watts of power. Copper signal traces which are not illustrated in FIG. 1 will connect that power from via pair 58 to the LED circuitry using methods known in the art of LED lamp design. Although LED elements 54 are illustrated in FIG. 1, the associated circuitry and other components for LED lamp operation and control signal processing are not illustrated. The particular design the LED lamp circuitry including components such as resistors, power conversion circuitry or chips, and control signal processing such as dimming level processing circuitry and chips are outside the scope of this invention, and will be included and designed using methods and practices standard in the art of LED lamp design. Necessary to the described embodiment of the present invention is that each individual light producing section 52 contains the needed LED lamp circuitry to put the control signal information provided by control signal contact pairs 56, and the electrical power provided by vias 58*a* and 58*b* to productive use within each light producing section 52.

LED light strip 50 light producing section 52 also contains installation holes 55 within each section 52. These installation holes allow for a fastener to be passed through LED light strip core structure 59 and, by various methods illustrated in FIG. 3, secure LED light strip 50 within a mounting structure 63. All installation holes are centered across the width of light producing section 52, and are centered between two LED elements 55 along its length. In the illustrated embodiment, two installation holes 55 are located within each light producing section 52, and each is located between an adjacent LED element 55 closest to a clip section 51 and an adjacent LED element closest to via pair 58.

Now referring in particular to FIG. 2 of the present invention a view of the underside of LED light strip 50 is presented. The view of LED light strip 50 in FIG. 2 is described in relation to FIG. 1 as follows. In FIG. 1, the label FIG. 1 is at the bottom center of the figure, and the label 50 is at the bottom of the figure, and at the left of the figure. The orientation of LED light strip 50 within FIG. 1 can be similarly described with a via 58*a* as the closest via to the left side of the figure when viewed such that the labels are upright. Accordingly, in FIG. 1 a via 58*b* is represented as the closest via to the right side of the figure. Similarly, control signal contacts 56*b* are the contacts closest to the top of the figure and control signal contacts 56*a* are the closest to the bottom of the figure. The top, bottom, left and right relative directions can be defined similarly for FIG. 2 with the label FIG. 2 at the bottom center of the figure and the label 50 at the bottom and left of the figure when viewed with the labels upright. The orientation as represented within FIG. 2 of the LED light strip of this first embodiment of the present invention is such that the closest via to the left side of the figure is a via 58*a* and the closest via to the right side of the figure is a via 58*b*. Similarly, the closest vias to the top of the figure when the labels are viewed upright are vias 58*a*, and vias 58*b* are similarly the closest vias to the bottom of the figure. These relative descriptions of the orientation of LED light strip 50 within FIG. 1 and FIG. 2 show that the edges of LED light strip 50 sections 52 closest to the bottom of the figure in FIG. 1 are in FIG. 2 shown that the same edges of LED light strip 50 sections 52 are now closest to the top of the figure. The left most end of LED light strip 50 as viewed in FIG. 1 with the labels upright is the same left most end of LED light strip 50 as viewed in FIG. 2 with the labels upright.

Installation holes 55, clip alignment holes 57 and holes for vias 58*a* and 58*b* are in their respective places as described for FIG. 1, given the orientation of LED light strip 50 as presented in the view of the underside of LED light strip 50 in FIG. 2. Voltage bus 60 is a continuous voltage bus comprised of two voltage bus conductors 60*a* and 60*b*. Voltage bus 60 conductors are printed directly onto core structure 59 using standard PCB methods and practices. Voltage bus conductors 60*a* and 60*b* are oriented longitudinally along the underside surface of core structure 59 and are of a constant width and thickness, except where they are widened to provide contact areas for a lower clip half. Each voltage bus conductor is parallel to the other as well as parallel to the edges of LED light strip sections 52 and the narrower edges of clip sections 51 and proceeds in a straight manner along the length of LED light strip 50 with no bends or curves. Each voltage bus is centrally located across LED light strip 50 between clip alignment hole 57 and the narrower edge of clip section 51, and are spaced apart sufficiently so as to be electrically insulated from each other.

The conductors for voltage bus 60 are notably wider and may be printed thicker than standard PCB traces, as they will transmit electrical power for more than one LED light producing section 52. Voltage bus 60 may be designed to carry a maximum power such as 95 watts at 24 volts of direct current, by way of example, and the voltage bus would be designed to carry this maximum load as far as needed until it is consumed by a collection of light producing sections 52. If, by way of example, each section 52 would consume at maximum 5 watts of power, then voltage bus conductors 60a and 60b would be designed to safely carry that power for a continuous series of 18 consecutive sections 52 where each section 52 is separated by a clip section 51. The total power consumed collectively by LED light strip sections 52 at maximum is 90 watts, and voltage bus conductors 60a and 60b would be designed to have fewer than 5 watts of resistive losses as the power is carried that distance.

Voltage bus conductors 60a and 60b travel continuously across both light producing sections 52 and clip sections 51 including across removable portion 53 within each section 51. When a voltage bus installation has consumed all of the available power, such as after 18 continuous sections as described above, voltage bus 60 can be interrupted by removing removable portion 53 of the last clip section attached to the end of the 18$^{th}$ consecutive light producing section 52. The installation of LED light strip 50 can continue with a new bus on the other side of the removed removable portion 53 as long as an electrical connection across the removed portion 53 is not made within a lower clip half. The subsequent LED light producing sections 52 can have a separate 95 watts of power at 24 volts for use in a continuing installation of LED light strip 50.

Signal traces 61a and 61b transmit power for one light producing section 52 from voltage bus conductors 60a and 60b, respectively, to vias 58a and 58b, respectively, which then transmit power through LED core structure 59 to the top side of LED light strip 50 where the power is used for that individual light producing section 50 as described above. Traces 61a and 61b are noticeably thinner than voltage bus conductors 60a and 60b as they will only transmit the power needed for one light producing section 52, not the power for many sections 52. Trace 61a travels orthogonally from its electrical connection to the side of voltage bus 60a closest to installation hole 55 and travels in a straight line to a point that is collinear along the length of LED strip 50 with the center point of via 58a at which point it makes a 90 degree turn and proceeds a short distance along the length of LED light strip 50 to an electrical connection with via 58a. Trace 61b travels orthogonally from its electrical connection to the side of voltage bus 60b closest to installation hole 55 and travels in a straight line to a point that is collinear along the length of LED strip 50 with the center point of via 58b at which point it makes a 90 degree turn and proceeds a short distance along the length of LED light strip 50 to an electrical connection with via 58b.

Voltage bus contacts 62a and 62b are widened areas of the same conductive material and the same thickness as voltage bus conductors 60a and 60b. This increased width increases the surface area available to make an electrical connection with an electrical contact within a lower clip half as described in FIG. 4. Voltage bus contacts 62a and 62b are arranged in pairs in this first embodiment of the present invention, where each pair of one 62a and one 62b are collinear across the underside of LED light strip 50 clip section 51 with one of 62a and 62b on each side of clip alignment hole 57. Each voltage bus contact 62a is also collinear along the length of LED light strip 50 with the other voltage bus contact 62a on the other side of removable portion 53 within each clip section 51 on the underside of LED light strip 50 as oriented in FIG. 2. Voltage bus contacts 62b are similarly collinear along the length of LED light strip 50 within the underside of each clip section 51 illustrated in FIG. 2 of this first embodiment of the present invention.

Figure 3A:
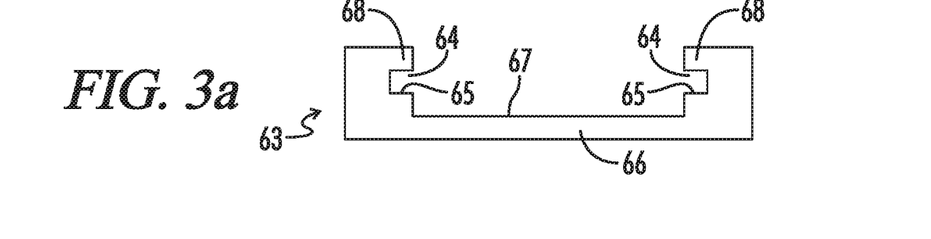
FIG. 3*a* is a side elevation view of the mounting structure for the LED light assembly.

Referring now in particular to FIGS. 3a through 3e of this preferred embodiment of the present invention, these figures illustrate the system and method of installation of LED light strip 50 within mounting structure 63, illustrating several alternatives within this preferred embodiment. FIG. 3a illustrates an end-on view of mounting structure 63. Mounting structure 63 is a unitary structure with a consistent profile along its length whose cross sectional profile is illustrated in FIG. 3a which is formed from a strong rigid material which is suitable to being pierced by a piercing fastener without splitting or otherwise rupturing. Mounting structure 63 is also substantially less flexible than the somewhat flexible and elastic material comprising structural core 59 of LED light strip 50. A material such as a common high strength thermoplastic, by way of example, would be suitably rigid relative to core structure 59 of LED light strip 50.

Mounting structure 63, when viewed in profile as in FIG. 3a, is comprised of two rectangular portions at each end of mounting structure 63 where each rectangular portion is connected by a substantially lower horizontal member 66. Each rectangular structure contains an installation slot 64 which protrudes into the side of each outer rectangular portion which faces the other outer rectangular portion of mounting structure 63. Installation slots 64 face each other and also mounting slot floors 65 of each mounting slot 64 are at the same height above floor 67 where floor 67 is both the floor of mounting structure 63 and the surface of member 66 facing toward mounting slots 64. Led light strip retention tab 68 is the portion of the rectangular portion at each end of mounting structure 63 which holds the edge portions of an installed LED light strip 50 sections 52

Mounting structure 63 in one embodiment will be the same length as the LED light strip 50 to be installed, although it may be longer if desired. Mounting structure 63 can be manufactured by any of several processes know in the art, but extrusion may be particularly attractive given a constant profile and a shape conducive to open extrusion.

Figure 3B:
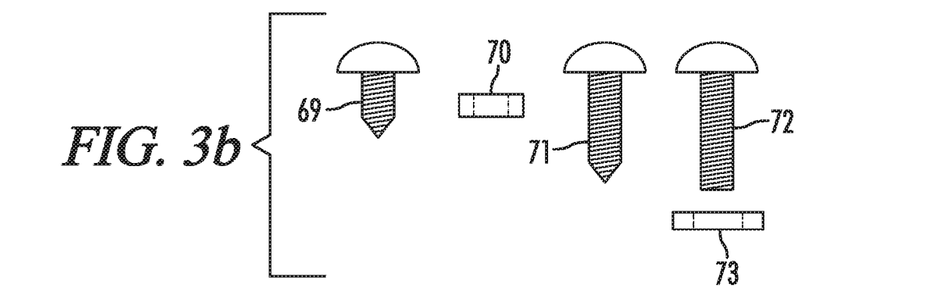
FIG. 3*b* is a side elevation view of several alternative fasteners for securing the LED light strip to the mounting structure.

FIG. 3b illustrates three examples of fasteners which may be used to install LED light strip 50 within mounting structure 63, as well as height maintenance cylinder 70, which shall be used with all three fastener types.

Figure 3C:
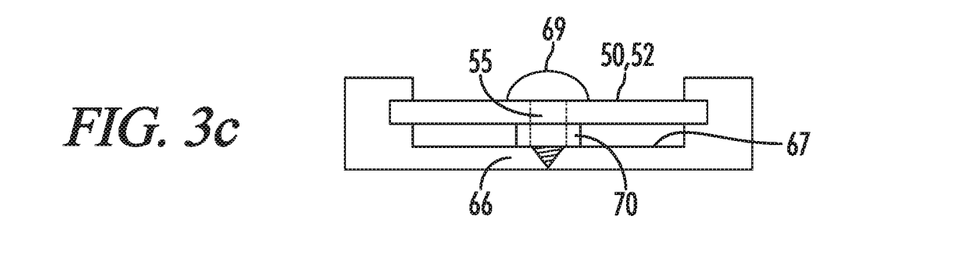
FIG. 3*c* illustrates a manner of use of a first fastener.

Fastener 69 is a threaded piercing fastener whose length is such that when installed as illustrated in FIG. 3c the threaded portion pierces floor 67 of mounting structure 63 but does not pass through the underside of member 66.

Figure 3D:
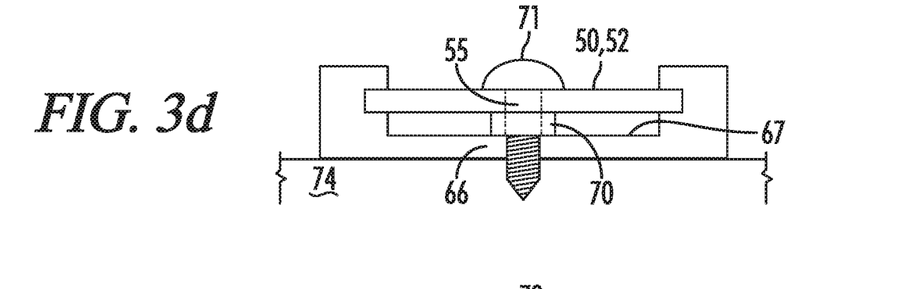
FIG. 3*d* illustrates a manner of use of a second fastener.
Figure 3E:
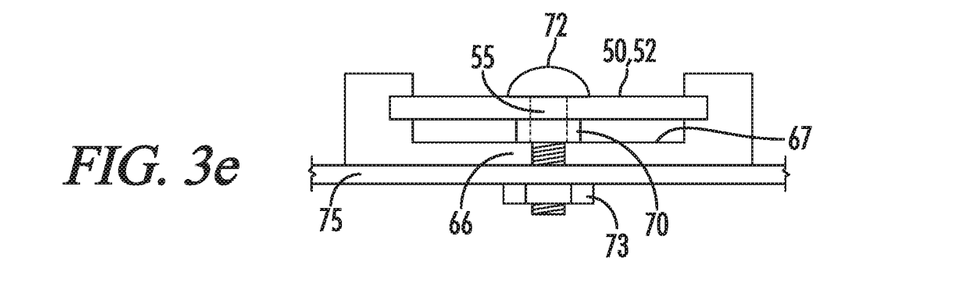
FIG. 3*e* illustrates a manner of use of a third fastener.

Height maintenance cylinder 70 is a rigid cylinder whose interior diameter is sufficiently wide to allow fasteners 69, 71 and 72 to readily pass through without engaging the fasteners' threads, and whose outer diameter is wider and provides sufficient cross sectional area with sufficient strength to support the center of LED light strip 50 and maintain the spacing underneath LED light strip 50 and above floor 67 of mounting structure 63 when any of fasteners 69, 71 or 72 are tightened as illustrated in FIGS. 3c, 3d and 3e.

Fastener 71 is a threaded piercing fastener whose length is such that when installed as illustrated in FIG. 3d the threaded portion pierces floor 67 and passes through member 66 and pierces material 74 onto which mounting structure 63 is to be installed.

Fastener 72 is a non-piercing fastener to be threaded through nut 73, whose interior diameter and threading is such that nut 73 threads securely onto the threaded portion of fastener 72. Fastener 72 is sufficiently long that when installed as illustrated in FIG. 3e fastener 72 passes through a hole in member 66 and through a hole in rigid sheet material 75, providing sufficient protruding length to enable nut 73 to thread and tighten against sheet material 75.

Prior to securing LED light strip 50 within mounting structure 63 first both LED light strip 50 and height maintenance cylinder 70 must be placed within mounting structure 63. In order to ease proper placement, height maintenance cylinder 70 may be adhered to the underside of LED light strip 50 such that they are concentric with each installation hole 55 present within the length of LED light strip 50 prior to installation. LED light strip 50 can be installed with cylinders 70 fixed in place by pinching each light producing section by squeezing the outer edges of section 52 closer together such that somewhat flexible and elastic structural core 59 curves with the center portion elevated and bringing the outer edges of that section 52 closer together such that that section 52 can now pass LED light strip retention tabs 68. When the outer edges of a pinched and curved across its width section 50 reach installation slots 64, the installer can release the section 52, whose elastic structural core returns to its original shape with the edges of section 52 now in each installation slot 64 within mounting structure with a height maintenance cylinder 70 adhered in place at both installation holes 55 present in that section 52. This pinch and release process is repeated for each section 52 along the installed length of LED light strip 50. With LED light strip 50 placed within mounting structure 63 and cylinders 70 in place at every installation hole 55, fasteners 69 or 71 or 72 can now be installed to secure the installation as illustrated respectively in FIGS. 3c, 3d and 3e.

FIG. 3c illustrates the use of fastener 69 to secure LED light strip 50 within mounting structure 63. With LED light strip 50 and cylinders 70 already placed within mounting structure 63, threaded fastener 69 is placed through LED light strip 50 at an installation hole 55 and through cylinder 70, neither of which engage the threads of fastener 69. Fastener 69 will then pierce floor 67 of mounting structure 63 engaging the threaded portion of fastener 69 which draws fastener 69 into member 66 with continued rotation until the underside of the head of fastener 69 is drawn tightly against the top side of LED light strip 50, thereby securing LED light strip 50 within mounting structure 63. That procedure is repeated until there is a fastener 69 tightened against the top of LED light strip 50 at each installation hole 55 over the entire length of LED light strip 50. This process results in an LED light strip that is sufficiently mechanically secure and needs no further reinforcement.

FIG. 3d illustrates the use of fastener 71 to secure LED light strip 50 within mounting structure 63 and secure the resulting assembly onto a material 74. With LED light strip 50 and cylinders 70 already placed within mounting structure 63, threaded fastener 71 is placed through LED light strip 50 at an installation hole 55 and through cylinder 70, neither of which engage the threads of fastener 71. Fastener 71 will then pierce floor 67 of mounting structure 63 engaging the threaded portion of fastener 71 which, with continued rotation, draws fastener 71 into and through member 66 and into material 74 until the underside of the head of fastener 71 is drawn tightly against the top side of LED light strip 50, thereby securing LED light strip 50 within mounting structure 63. That procedure is repeated until there is a fastener 71 tightened against the top of LED light strip 50 at each installation hole 55 over the entire length of LED light strip 50. This process results in an LED light strip 50 that is sufficiently mechanically secure and needs no further reinforcement. Use of fastener 71 additionally results in the assembly of LED light strip 50 and mounting structure 63 being mounted securely onto material 74.

FIG. 3e illustrates the use of fastener 72 and nut 73 to secure LED light strip 50 within mounting structure 63 and secure the resulting assembly onto a rigid sheet material 75. With LED light strip 50 and cylinders 70 already placed within mounting structure 63, a piercing drill bit is chosen whose diameter is small enough that the drill bit will not engage with installation hole 55 or cylinder 70, but large enough that fastener 72 can pass through the drilled hole without engaging the threads on fastener 72. A hole is then drilled through both member 66 of mounting structure 63 and rigid sheet material 75 at the location on sheet 55 where each installation hole 55 will be when LED light strip 50 is installed. Then a fastener 72 can be placed through installation hole 55, cylinder 70, and through the holes drilled in both member 66 of mounting structure 63 and sheet material 75. After fastener 72 is placed nut 73 can be threaded onto fastener 72 on the opposite side of sheet material 75 from LED light strip 50 and nut 73 can be threaded along the threaded portion of fastener 72 with continued rotation until the underside of the head of fastener 72 is sufficiently tight against the top side of LED light strip 50. This shall be repeated until a fastener 72 is drawn tightly against the top of LED light strip 50 at every installation hole 55 along the installed length of LED light strip 50. This process results in an LED light strip 50 that is sufficiently mechanically secure and needs no further reinforcement. Use of fastener 72 and nut 73 additionally result in the assembly of LED light strip 50 and mounting structure 63 being mounted securely onto rigid sheet material 75.

Figure 4A:
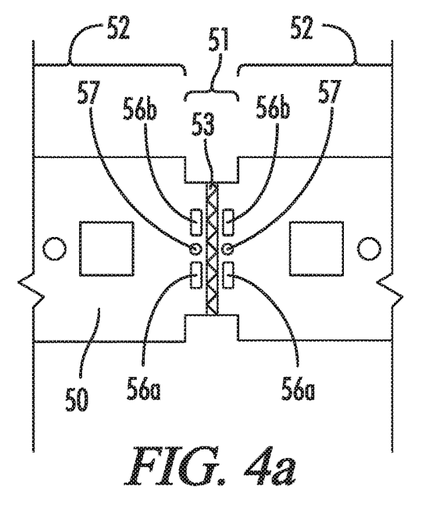
FIG. 4*a* is a top plan view of the LED light strip clip section.

Reference will now be made in particular to FIGS. 4a through 4d where the clip system and method for connecting different sections of LED light strip 50 and making various electrical connections are detailed. FIG. 4a is a view from above of a portion of LED light strip 50 containing an intact portion 53 within a complete clip section 51 and a partial view of the adjacent light producing sections 52. Two pairs of control signal contacts 56a and 56b as well as clip alignment holes 57 are illustrated within clip section 51. Mounting structure 63 is not illustrated in FIG. 4a.

Figure 4B:
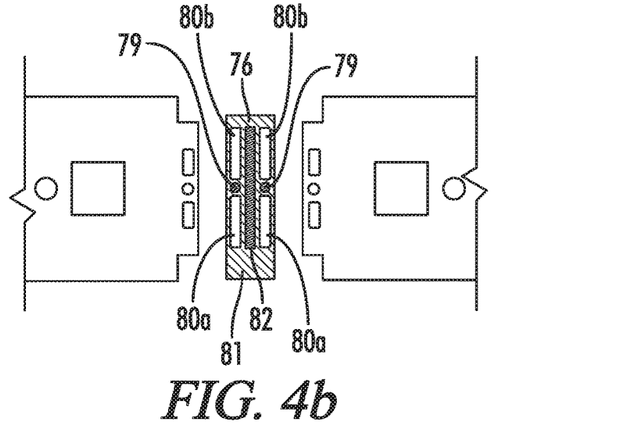
FIG. 4*b* is a top plan view of the LED light strip clip section with the removable section having been removed and illustrating the lower half of the clip assembly.

FIG. 4b illustrates the same portions of LED light strip 50 as FIG. 4a except for removable portion 53 which has been removed as described above, and the resulting two sections are separated with lower clip half 76 illustrated between the separated portions of LED light strip 50.

Lower clip half 76 is made of a rigid high-strength material such as a high-strength thermoplastic which is significantly more rigid than core structure 59 of LED light strip 50. Lower clip half 76 contains two pairs of voltage bus contacts, 80a and 80b, with one pair on each side of electrical break assurance barrier 82. Voltage bus contacts 80a and 80b are designed to connect electrically with their respective counterpart voltage bus contacts 62a and 62b. Voltage bus contacts 80 are both raised above the surrounding surface of lower clip half 76 where the surrounding surface, indicate with striped lines, seats against the underside surface of core structure 59 when clip halves 76 and 77 are fastened together to form a clip assembly 78. As a result of contacts 80 being raised above the surface they will be accordingly driven into contact with bus voltage contacts 62 on the underside of LED light strip 50 sections 51 driving those contacts into the somewhat flexible and elastic core structure 59. When core structure 59 is slightly deformed by contacts 62 being pushed into core structure 59 by the raised lower clip contacts 80, the elasticity of core structure 59 pushes back as it tries to regain its original shape, resulting in a force which maintains electrical contact between contacts 62 on the underside of clip section 51 of LED light strip 50 and contacts 80 within lower clip half 76.

Alignment pins 79 are illustrated in FIG. 4b, these pins have a height that places them at least partway through clip alignment holes 57 within clip section 51 of LED light strip 50 when portions 51 are placed on lower clip half 76, but not far enough to protrude through the top face of LED light strip 50 when placed. Alignment pins 79 therefore ensure proper alignment of sections 51 within a clip assembly 78 and, when removable portion 53 is removed, alignment pins 79 prevent the separated section 51 from being pulled out of location or entirely out of a clip assembly 78. Electrical break assurance barrier 82 is also illustrated within lower clip half 76 in FIG. 4b. Electrical barrier 82 has a height that places it at least partway through core structure 59 of LED light strip 50 when removable portion 53 has been removed. Electrical barrier 82, being made from a non-conductive thermoplastic by way of example, prevents transmission of electrical power from voltage bus 60 across the space where a removable portion 53 would otherwise be. Further, because electrical barrier 82 occupies at least some of the space otherwise occupied by removable portion 53, barrier 82 prevents misapplication of the clip when removable portion 53 has not been removed.

Figure 4C:
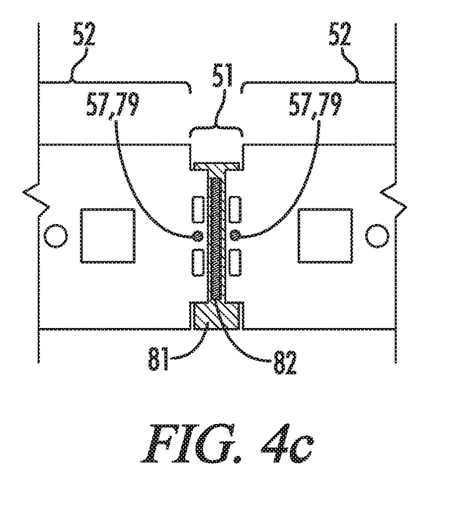
FIG. 4*c* illustrates the LED light strip clip section positioned over the lower half of the clip assembly.

FIG. 4c illustrates the same two LED light strip 50 portions with portion 53 of clip section 51 removed, and the remaining portions of clip section 51 are placed in lower clip half 76 with alignment pin 79 within clip alignment hole 57 and barrier 82 where removable section 53 was before removal. An important feature of this invention is that the position of sections 52 on either side of an installed clip remains unchanged when a clip is placed. This allows for configuration changes to occur within an existing installation of LED light strip 50 which can involve adding or moving clips and all sections 52 of LED light strip 50 will remain in exactly the same position within mounting structure 63.

Figure 4D:
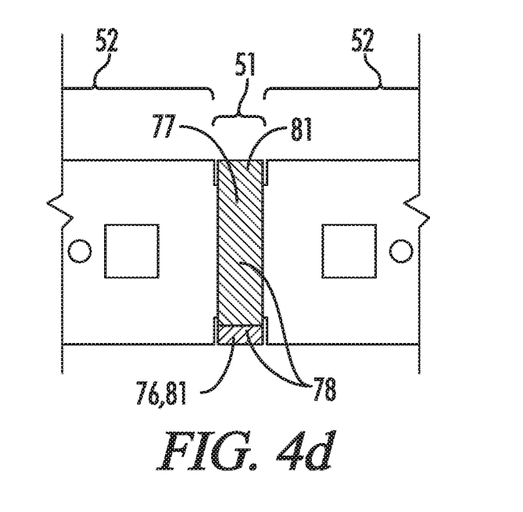
FIG. 4*d* illustrates the upper and lower clip halves of the clip assembly attached to the LED light strip clip section.

FIG. 4d illustrates the same two LED light strip 50 portions with upper clip half 77 snapped into place onto lower clip half 76. This view from above does not include mounting structure 63. Although not illustrated in FIG. 4d upper clip half 77 can contain, as desired, contacts which are positioned to electrically connect with control signal contacts 56 on LED light strip 50 sections 51. These contacts within upper clip half 77 are designed and perform similarly to contacts 80 within lower clip half 76, including pressing slightly into core structure 59 eliciting a force due to the elasticity of core structure 59 which reinforces the electrical contact. Clip halves 76 and 77 snap against each other using standard methods and practices for snapping plastic parts, especially connectors, together that are known in the art. This mechanical connection holds the clip assembly together with each clip half having a portion 81 which is inside an installation slot 64 of mounting structure 63, where each clip half's portion 81 is in the opposite side from the others. In this manner clip assembly 78 is secured within mounting structure 63 alongside the pinched-into-place sections 52 as described previously.

Figure 5:
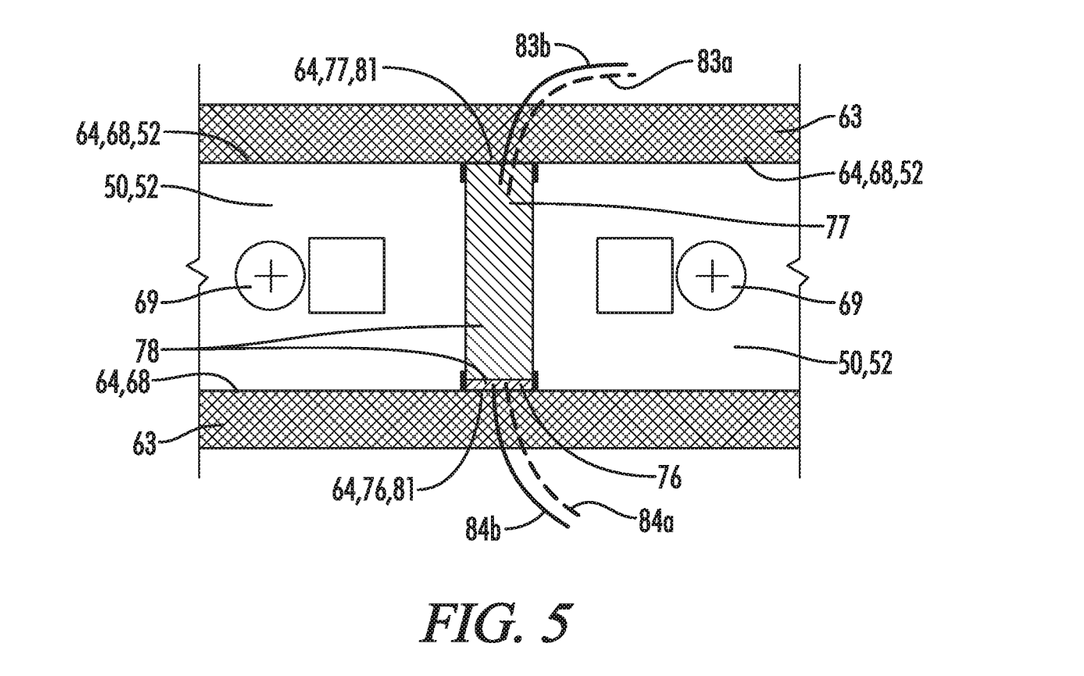
FIG. 5 is a plan view illustrating the LED light strip and clip assembly mounted to the mounting structure.

Now referring in particular to FIG. 5, there is shown a view of portions of two consecutive LED light strip 50 sections 52 with a clip assembly 78 of lower clip half 76 and upper clip half 77 installed over clip section 51, and in addition where the entire assembly is installed within a length of mounting structure 63. Fastener 69 has been installed and secures the central portion of LED light strip 50 across its width, and both edges of sections 52 are located within installation slots 64 and kept in place by an LED light strip retention tab 68 running the length of mounting structure 63 on either side. External wires are also illustrated with 83a and 83b connecting to the upper clip half 77 contacts which connect electrically to control signal contacts 56a and 56b using standard methods and practices for electrical wire connections. Wires 84a and 84b are similarly electrically connected to lower clip half 76 voltage bus contacts 80a and 80b using standard methods and practices for electrical wire connections. Portion 81 of lower clip half 76 is within the installation slot 64 closest to external wires 84, and portion 81 of upper clip half 77 is within the installation slot closest to external wires 83.

Figure 6A:
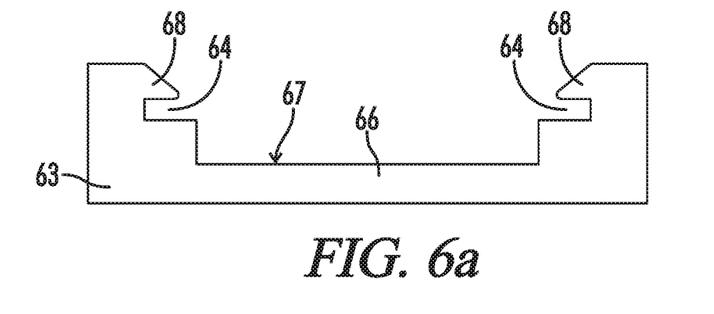
FIG. 6*a* is a side elevation view of another mounting structure for the LED light assembly.
Figure 6B:
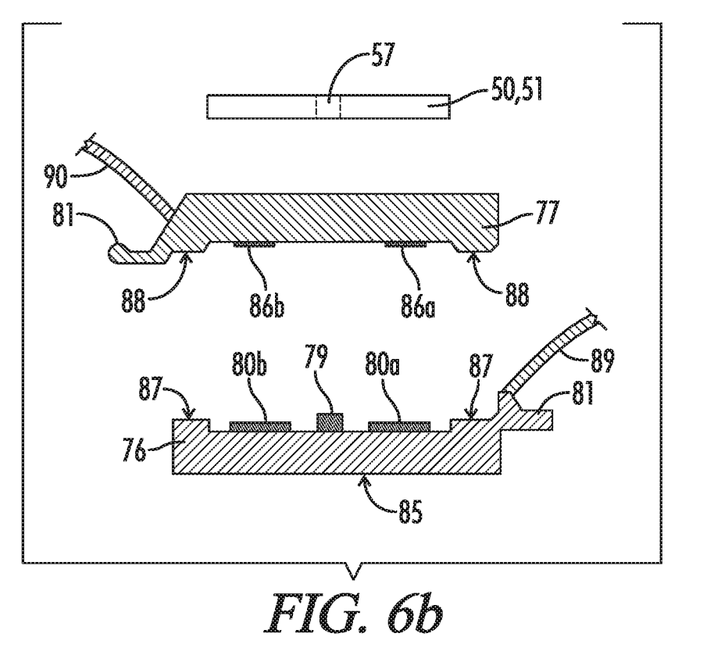
FIG. 6*b* is a side elevation view of the components of the clip assembly.

FIG. 6a provides a cross sectional view of mounting structure 63 whose LED light strip retention tab 68 is adapted without any change in function. FIG. 6b provides a cross sectional view of a clip section 51 of LED light strip 50, and of upper clip half 77 and lower clip half 76. While are certain variations to the components within FIGS. 6a through 6c as compared to FIGS. 1-5, the concepts apply equally to the preferred embodiment of the present invention across all included figures.

Surface 85 of the underside of lower clip half 76 is designed to sit directly on member 66 floor 67 within mounting structure 63. This allows for upper clip half to be pushed hard enough into lower clip half to engage the mechanical snap-type fasteners, standard in the art, which hold clip assembly 78 together. This mechanical mechanism of holding clip assembly 78 together will engage when upper clip half surfaces 88 are pressed into and engage lower clip half surfaces 87.

Figure 6C:
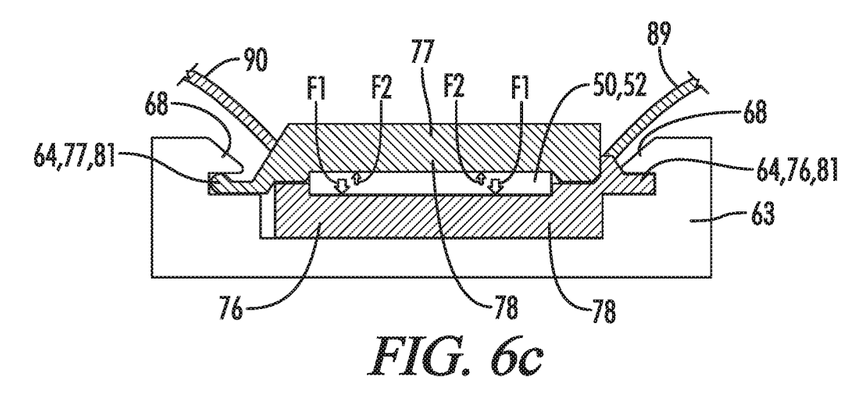
FIG. 6*c* is a side elevation view of the clip assembly secured to the mounting structure and LED light strip.

Upper clip half 77 has an external access cable 90 which connects electrically using standard methods and practices known in the art to upper clip half contacts 86a and 86b. Upper clip half contacts 86a and 86b make an electrical connection with control signal contacts 56a and 56b within clip assembly 78. The cross sectional view illustrates how upper clip half contacts 86 and lower clip half contacts 80 protrude beyond the clip and are pressed into core structure 59 when the clip assembly is snapped together as is illustrated in FIG. 6c. Lower clip contacts 80a and 80b are designed to safely transfer the entire rated power of voltage bus 60, and accordingly the lower clip contacts 80 are taller as well as wider. The additional height above the lower clip half surface which mates with the underside of core structure 59 for clip section 51 means contacts 80 will push voltage bus contacts 62a and 62b farther into core structure 59 generating an accordingly larger force due to the elasticity of core structure 59. This force is labelled in FIG. 6c as F1. Upper clip half contacts 86a and 86b make electrical contact with control signal contacts 56a and 56b and do not need to transfer significant electrical power. Accordingly, clip contacts 86a and 86b are smaller in size and protrude less into core structure 59, generating an accordingly smaller force F2 as illustrated in FIG. 6c. Lower clip half 76 also has an external access cable 89 which connects electrically using standard methods known in the art to lower clip half contacts 80a and 80b.

FIG. 6b also illustrates an adaptation to portion 81 of upper clip half 77 whereby the farthest end of portion 81 from upper clip half 77 contacts 86 is rounded to facilitate placement of upper clip half 77 which results in a clip assembly 78 over a clip section 51 of LED light strip 50 of the present invention. In addition to the rounded end of portion 81, portion 81 is connected to the remainder of upper clip half 77 by a narrowed structure which allows upper clip half 77 to rotate into place without being obstructed by LED light strip retention tab 68.

FIG. 6c illustrates that with upper clip half 77 mechanically secured and snapped into place as illustrated clip assembly 78 is secured within mounting structure 63 with portion 81 of upper clip half 77 secured within one installation slot 64 and portion 81 of lower clip half 76 secured in the opposite installation slot 64. The system and method of installing LED light strip 50 within mounting structure 63 using a pinching action to insert the edges of sections 52 into installation slots 64 and installation fasteners of various types in each installation hole 55 was noted previously as being entirely sufficient to mechanically secure LED light strip 50 within mounting structure 63. Installing a clip assembly where needed for electrical connections or for joining sections where removable portion 53 of clip section 51 has been removed secures the installation even further.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. As used throughout, ranges are used as shorthand for describing each and every value that is within the range. Any value within the range can be selected as the terminus of the range.

What is claimed is:

1. An LED light strip assembly comprising:
    an LED light strip having one or more alternating, integrally formed light producing sections and clip receiving sections,
    a plurality of light emitting elements mounted on the light producing sections,
    a removable portion extending the width of each of the clip receiving sections,
    a mounting structure having a continuous profile, a lower horizontal member defining a floor surface, first and second side members extending from the lower horizontal member, and opposing alignment mounting slots formed in the first and second side members, the mounting structure configured to support the LED light strip with the light producing sections supported in said mounting slots, and
    a two-part clip assembly including a lower clip half and an upper clip half, the lower clip half configured to extend over a lower surface of one of the clip receiving sections and having an extension which is securable in one of the mounting slots within the mounting structure, and the upper clip half configured to extend over an upper surface of one of the clip receiving sections and to connect to the lower clip half, and including an extension which is securable in the opposing mounting slot within the mounting structure.

2. The LED light strip assembly of claim 1 in which the LED light strip is further comprised of a structural core formed of an elastically deformable insulating and nonconductive material, having a common profile of similar thickness across its width and length.

3. The LED light strip assembly of claim 2 additionally comprising pairs of control signal contacts positioned on opposite sides of the removable portion of the clip receiving sections, the control signal contacts connected by signal traces for conveying control signal information to the light emitting elements within each light producing section and across the removable portions.

4. The LED light strip assembly of claim 3 additionally comprising electrical connections for transmission of power from an underside voltage bus through the structural core to the light emitting elements and supporting circuitry.

5. The LED light strip assembly of claim 4 additionally comprising a nonconductive barrier extending outwardly from the lower clip half a sufficient distance to pass a voltage bus on the underside of the LED light strip substrate in order to ensure a complete power bus break when the clip assembly is secured to one of the clip receiving sections.

6. The LED light strip assembly of claim 5 in which the clip receiving sections have a having a reduced width in relation to the light producing sections.

7. The LED light strip assembly of claim 6 in which the upper and lower clip halves of the clip assembly exert a compression force on the structural core when connected to one of the clip receiving sections which causes the structural core to deform and exert a countering force on the clip assembly which ensures that a stable electrical contact is made between matching contact areas in the clip assembly and the clip receiving sections.

8. The LED light strip assembly of claim 7 additionally comprising one or more electrical contacts positioned on the upper clip half which electrically connect with the LED light strip control signal contacts when the clip assembly is secured to one of the clip receiving sections to enable the utilization of control signals to operate the LED light strip.

9. The LED light strip assembly of claim 8 additionally comprising a pair of clip assembly alignment holes and at least one pair of voltage bus contacts positioned on opposite sides of the removable portion.

10. The LED light strip assembly of claim 9 in which when the LED light strip is secured to the mounting structure individual light producing sections can be removed from the assembly and replaced without altering the position of other light producing sections.

11. The LED light strip assembly of claim 10 in which a clip assembly can be secured to a clip receiving section without changing the installation position of other portions of the LED light strip.

12. The LED light strip assembly of claim 11 additionally comprising plurality of spaced apart installation holes extending between the front surface and back surface of the light producing sections.

13. The LED light strip assembly of claim 12 in which the mounting structure additionally comprises a compartment formed underneath the LED light strip in which one or more voltage busses attached to the bottom of the LED light strip are housed.

14. The LED light strip assembly of claim 13 in which electrical power is transmitted between LED light producing sections exclusively through the voltage busses in the compartment.

15. The LED lights strip assembly of claim 14 additionally comprising a plurality of fasteners for securing the light producing sections of the LED light strip support structure to the mounting structure.

16. The LED light strip assembly of claim 15 additionally comprising height maintenance spacers having a through aperture and being dimensioned to be positioned between the underside of the LED light strip main light producing section support structure and floor of the mounting structure lower horizontal member when secured to the mounting structure.

17. The LED light strip assembly of claim 16 in which the lower clip half extension includes a structural portion configured to fit in one of the LED light strip mounting slots within the mounting structure, first and second clip alignment pins extending from a top surface of the lower clip half, one or more pairs of clip voltage bus contacts positioned for making electrical contact with the voltage bus contacts on the underside of the LED light strip clip, and the nonconductive barrier extending outwardly from the lower clip half into the structural core of the clip receiving section when the removable portion is removed a sufficient distance to pass the voltage bus on the underside of the LED light strip substrate in order to ensure a complete power bus break.

18. The LED light strip assembly of claim 17 in which the upper clip half extension includes a structural portion configured to fit in one of the LED light strip mounting slots within the mounting structure, and one or more electrical contacts positioned to electrically connect with the LED light strip control signal contacts to enable the utilization of control signals to operate the LED light strip.

19. The LED light strip assembly of claim 18 additionally comprising external wires connected to the contacts within the upper clip half to either insert a control signal such as a dimming value, or to extract a control signal to connect to a useful external purpose.

20. The LED light strip assembly of claim 19 additionally comprising external wires connected to the contacts within the lower clip half for connection of an external device such as a power supply to underside voltage bus, or to extract power from the underside voltage bus to power a peripheral device, such as an occupancy sensor or an electronic light control interface.

* * * * *